United States Patent [19]

Son et al.

[11] Patent Number: 5,475,046
[45] Date of Patent: Dec. 12, 1995

[54] METHOD FOR THE PRODUCTION OF HIGHLY TRANSPARENT POLYESTER FILM

[75] Inventors: Young H. Son, Seoul; Kyung S. Tae, Gumi; Chul H. Kim, Seoul; Byung C. Lee, Gumi, all of Rep. of Korea

[73] Assignee: Cheil Synthetics Inc., Kyungsangbuk-Do, Rep. of Korea

[21] Appl. No.: 346,243

[22] Filed: Nov. 23, 1994

[30] Foreign Application Priority Data

Jan. 20, 1994 [KR] Rep. of Korea ............... 94-1017

[51] Int. Cl.$^6$ ............... C08J 3/09; C08K 3/18; C08K 3/22
[52] U.S. Cl. ............... 524/430; 528/272; 528/275; 528/282; 524/437
[58] Field of Search ............... 528/272, 275, 528/282; 521/48, 48.5; 524/430, 437

[56] References Cited

U.S. PATENT DOCUMENTS 4,221,697  9/1980  Osborn et al. ............... 524/853

FOREIGN PATENT DOCUMENTS 486225  5/1992  European Pat. Off. .

Primary Examiner—James J. Seidleck
Assistant Examiner—Duc Truong
Attorney, Agent, or Firm—Nikaido, Marmelstein, Murray & Oram

[57] ABSTRACT

A method for the production of polyester film is disclosed including the steps of: esterifying at least one species of carboxylic acid with at least one species of glycol; adding to the ester composition macro particles of silica of an average diameter of approximately 1.3 to approximately 2.0 μm and fine particles of aluminum oxide of an average diameter of approximately 20 to approximately 200 nm; polycondensing the resulting mixture, to give a filled polyester resin; melting the filled polyester resin; molding the melt into a sheet; and biaxially stretching the sheet to produce a film product which is superior in haze and in static friction coefficient ($U_x$)/kinetic friction coefficient ($U_k$) ratio The polyester film of the present invention does not appear milky. In addition, after slitting the polyester film and tightly winding it around a roll it does not have a substantial number of protrusions.

4 Claims, No Drawings

METHOD FOR THE PRODUCTION OF HIGHLY TRANSPARENT POLYESTER FILM

BACKGROUND OF THE INVENTION

1. Field of the Invention

The present invention relates, in general, to a method for the production of highly transparent polyester film and, more particularly, to an improvement in windability and a reduction in the milky property of such polyester films.

2. Description of the Prior Art

Polyester films are widely used for packaging or industrial purposes due to their superior properties in mechanical strength, thermal properties, electrical properties, chemical resistance, water resistance, transparency and the like.

In order to impart transparency to polyester film, inert, organic or inorganic particles have been added in as small amounts as possible. However, a low population of particles causes the speed at which the film travels on rolls during its processing to be reduced, which causes lower productivity. When the polyester film is wound, protrusions are formed, due to close proximately between layers in the roll making the appearance of the film roll poor. In addition, when a polyester film coated with a photosensitive material is exposed and processed, the protrusions on the film caused by the embedded, opacifying particles, abnormally refract the incident light, so that normal pictures are difficult to produce.

In order to prevent the formation of the protrusions, from the film surface the film is cut in its proper size and wound in an air steam. An air layer thus formed between the films restrains the films from adhering closely to each other. However, this causes the winding rate for the film to be reduced, which causes lower productivity. In addition, because a roll of polyester film which is wound with an air layer is coiled, the film is apt to come off from the center of roll during conveying the roll for subsequent processing, making the roll impossible to use in the subsequent process.

In order to solve the problems, inorganic particles, such as titanium dioxide, silicon dioxide and calcium carbonate, have been compounded into admixture with the resin when producing polyester film. However, it is difficult to secure transparency in the polyester film with conventional casting methods. That is to say, the inert inorganic compound particles improve the activity of the film but increase its haze, the standard which determines the transparency of polyester film. Accordingly, the inorganic compounds are restrictively used in polyester films which are destined for use in fields requiring high transparency.

Meanwhile, an attempt has been made to improve the activity of polyester film in that fine particles are used instead of large particles. European Patent No. 0486225A3 discloses the use of silica particles having a diameter of 0.1 to 0.5 μm. However, in this case, the polyester film wound around a roll appears milky, which may give a bad image.

SUMMARY OF THE INVENTION

Therefore, an object of the present invention is to overcome the above problems encountered in the prior art and to provide a method for the production of polyester film having superior transparency and windability.

In accordance with the present invention, the above object can be accomplished by the provision of a method for the production of polyester film, comprising the steps of: esterifying at least one species of carboxylic acid with at least one species of glycol; adding macro particles of silica with an average diameter of approximately 1.3 to approximately 2.0 μm and fine particles of aluminum oxide with an average diameter of approximately 20 to approximately 200 nm; polycondensing the resulting mixture, to give a polyester resin; melting the polyester resin; molding the melt into a sheet; and biaxially stretching the sheet, whereby the resultant polyester film is 75 to 125 μm thick, has a haze of not more than 2.0% at 589 nm, and has a static friction coefficient/kinetic friction coefficient ratio of not more than 0.70/0.60 such film does not have a milky appearance, and is superior in transparency and windability.

These and other objects and advantages of the present invention will become more apparent as the following description proceeds

DETAILED DESCRIPTION OF THE INVENTION

At least one species of carboxylic acid selected from the group consisting of terephthalic acid, isophthalic acid, adipic acid, sebacic acid, and glutamic acid is esterified or ester interchanged with at least one species of glycol. In an earlier or later stage of the esterification or ester-interchange, two different sizes and types of inert inorganic particles having different composition and average different diameters are added and then the resulting mixture is subjected to polycondensation, so as to obtain a polyester resin filled with such inorganic particles.

This polyester resin is dried sufficiently in a drier formed into a sheet by means of an extruder, and the sheet is then biaxially stretched, so as to produce a polyester film which is superior in transparency and windability.

In accordance with the present invention, the inert inorganic particles are grouped into macro particles and fine particles. The former, macro particles, have an average diameter of approximately 1.3 to 2.0 μm and preferably approximately 1.4 to 1.8 μm. They are added in an amount of approximately 0.001 to approximately 0.1% by weight based on total weight of the film. For example, if the average diameter of the macro particles exceeds 2.0 μm and the amount thereof in the polyester film exceeds 0.01% by weight, the polyester film will have improved slip property but will have a remarkably deteriorated transparency. On the other hand, if the average diameter of the macro particles is below 1.3 μm or the amount thereof in the polyester film is less than 0.001% by weight, the polyester film lacks adequate slip characteristics.

Prior to incorporating the macro particles, they are slurried in ethylene glycol and subjected to classification, for example in a centrifuge (Super Decanter, manufactured by Sharples K. K, Japan), so as to select the particles having a size between 1.3 and 2.0 μm.

With regard to the fine particles, they are aluminum oxide particles having a primary diameter of approximately 10 to approximately 70 nm and a secondary aggregation diameter of approximately 200 to approximately 300 nm. In order to isolate particles of these diameters, aluminum oxide particles are slurried in ethylene glycol and pulverized by a pulverizer (Motor Mill manufactured by Eiger Torrance Ltd, United Kingdom). The particles with an average diameter of approximately 20 to approximately 200 nm, and preferably approximately 30 to approximately 70 nm are selected.

In the polyester film, the amount of the fine particles are on the order of approximately 0.01 to approximately 0.5% by weight and preferably approximately 0.15 to approximately 0.5% by weight.

For example, if the average diameter of the fine particles is less than 20 nm, they seriously aggregate, so that the surface of the polyester film become inhomogeneous, which leads to a decrease in the activity of the polyester film. In addition, if the amount of the fine particles is below 0.01% by weight, the transparency becomes good, however the activity becomes extremely inferior. On the other hand, if the average diameter exceeds 200 nm or the amount exceeds 0.5% by weight, the polyester film has poor transparency.

The polyester films provided by the present invention are 75 to 125 μm thick and have a haze of not more than 2.0 at a wave length of 589 nm. In addition, the static friction coefficient ($U_s$)/kinetic friction coefficient ($U_k$) ratio of the polyester film of the present invention is not more than 0.70/0.60. Further, a roll of the polyester film does not appear milky. Furthermore, after slitting the polyester film, it can be tightly wound around a core into a roll without all protrusions extending from the surface of the would film.

The preferred embodiment of the present invention will now be further described with reference to specific examples.

1. Average Diameter of Particles

The sizes of particles in the slurry were measured using a measuring device for size distribution (SA-CP3, trade name, manufactured by Simatsu co. Ltd., Japan). The average diameter was regarded as the diameter of particles when the accumulated weight of the particles amounted to 50% of the total weight of the particles.

2. Haze

A sheet of polyester film cut into a size of 3.5 inches ×3.5 inches was placed vertically in a device for measuring haze commercially available from Nippon DenshoKu K. K. under a trade name of Automatic Digital Hazemeter. A light with a wavelength of 589 nm was projected toward the specimen in a direction perpendicular to its surface. At this time, the value of haze was calculated pursuant to the following formula and displayed in the hazemeter:

$$Haze = \frac{total\ scattered\ light}{total\ transmitted\ light} \times 100\%$$

3. Static Friction Coefficient ($U_s$)/ Kinetic Friction Coefficient ($U_k$)

A first sheet of polyester film having a size of 3 inches×6 inches was closely attached to a load of 150 g and a second sheet of the same size was placed on a measuring device. The first sheet, attached to the load, was placed on the second sheet and the load was pulled at a speed of 150 nm/sec. The force that resisted the initiation of sliding motion of one polyester film sheet over the other with which it was in contact was measured. From this force, the static friction coefficient ($U_s$) of the polyester film was derived. From friction between the two surfaces of the polyester films which were sliding over each other, the kinetic friction coefficient ($U_k$) was derived.

4. Milky Property of a roll of polyester film 10 sheets of polyester films, which each had a size of 3.5 inches, ×3.5 inches were stacked. The stack was observed with naked eyes and graded according to the following standards.

o: no milky appearance

Δ: a little milky appearance x: much of milky appearance

5. Windability

A polyester film was subjected to slitting to a width of 1,000 mm. This polyester film was wound at a speed of 150 mpm (meter per minute), and when 1000 m was wound, the number of protrusions formed on the exposed surface of the film was measured and graded according to the following standards.

⊚: no protrusion, usable o: 2 protrusions, usable x: 3 or more protrusions, unusable

EXAMPLE 1

To a mixture of 10 moles of dimethyl terephthalate and 20 moles of ethylene glycol there was added 0.08% by weight of manganese acetate tetrahydrate and 0.04% by weight of antimony trioxide and then subjected to ester-interchange.

To this product, silica particles, of an average diameter of 1.7 μm and aluminum oxide particles of an average diameter of 70 nm, were added in an amount of 0.008% by weight and 0.15% by weight, respectively, based on the total weight of a film to be formed later. The resulting mixture was polycondensed, to give a filled polyester resin.

This resin was subjected to melting in an extruder, to sheet molding through a T-die and to biaxial stretching, so as to prepare a polyester film with a thickness of 94 μm.

It was tested for physical properties and the results are shown in Table 1.

EXAMPLE 2

A polyester film was prepared in a manner similar to that of Example 1, except that silica particles of an average of 1.3 μm and aluminum oxide particles of an average diameter of 50 nm were added in an amount of 0,007% by weight based on the total film weight, and 0.20% by weight, respectively. The physical properties thereof are shown in Table 1.

EXAMPLE 3

A polyester film was prepared in a manner similar to that of Example 1, except that silica particles of an average of 1.3 μm and aluminum oxide particles of an average diameter of 50 nm were added in an amount of 0.009% by weight based on the total film weight and 0.30% by weight, respectively.

The physical properties thereof are shown in Table 1.

COMPARATIVE EXAMPLE 1

A polyester film was prepared in a manner similar to that of Example 1, except that silica particles of an average of 0.8 μm and aluminum oxide particles of an average diameter of 50 nm were added in an amount of 0.15% by weight based on the total film weight and 0.25% by weight, respectively.

The physical properties thereof are shown in Table 1.

COMPARATIVE EXAMPLE 2

A polyester film was prepared in a manner similar to that of Example 1, except that Speriglass (commercially available from Potters Industries Inc. USA) of an average of 2.5 μm and colloidal silica particles (commercially available from P. Q. Corporation, USA) of an average diameter of 80 nm were added in an amount of 0.2% by weight and 0.3% by weight, based on the total weight of the film, respectively.

The physical properties thereof are shown in Table 1.

COMPARATIVE EXAMPLE 3

A polyester film was prepared in a manner similar to that of Example 1, except that silica particles of an average diameter of 2.3 μm were added alone in an amount of 0.4% by weight.

The physical properties thereof are shown in Table 1.

COMPARATIVE EXAMPLE 4

A polyester film was prepared in a manner similar to that of Example 1, except that colloidal silica particles of an average diameter of 80 μm were added alone in an amount of 0.3% by weight.

The physical properties thereof are shown in Table 1.

TABLE 1

|  | \multicolumn{7}{c}{Example No.} |
| --- | --- | --- | --- | --- | --- | --- | --- |
|  | 1 | 2 | 3 | C1 | C2 | C3 | C4 |
| Film Thickness (μm) | 94 | 94 | 94 | 94 | 94 | 94 | 94 |
| Macro Particle | | | | | | | |
| Kind | $SiO_2$ | $SiO_2$ | $SiO_2$ | $CaCO_3$ | $SiO_2$ | $SiO_2$ | — |
| Ave. Diameter (μm) | 1.7 | 1.9 | 1.3 | 0.8 | 2.5 | 2.3 | — |
| Amount (wt %) | 0.008 | 0.007 | 0.009 | 0.15 | 0.2 | 0.4 | — |
| Fine Particle | | | | | | | |
| Kind | $Al_2O_3$ | $Al_2O_3$ | $Al_2O_3$ | $SiO_2$ | $SiO_2$ | — | $SiO_2$ |
| Ave. Diameter (μm) | 0.07 | 0.08 | 0.05 | 0.05 | 0.08 | — | 0.08 |
| Amount (wt %) | 0.15 | 0.20 | 0.30 | 0.25 | 0.30 | — | 0.30 |
| Physical Properties | | | | | | | |
| Haze (%) | 1.3 | 1.4 | 1.7 | 2.6 | 3.5 | 1.0 | 0.9 |
| $U_s/$ | 0.60/ | 0.60/ | 0.55/ | 0.57/ | 0.43/ | 0.75/ | 0.72/ |
| $U_k$ | 0.54 | 0.52 | 0.46 | 0.45 | 0.40 | 0.71 | 0.60 |
| Milky property | ○ | ○ | ○ | △ | X | ○ | X |
| Windability | ⊙ | ⊙ | ⊙ | ⊙ | ⊙ | X | X |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for the production of polyester film, comprising the steps of:

esterifying at least one dicarboxylic acid with at least one glycol;

adding macro particles of silica with an average diameter of approximately 1.3 to approximately 2.0 μm and fine particles of aluminum oxide with an average diameter of approximately 20 to approximately 200 nm;

polycondensing the resulting mixture, to give a filled polyester resin;

melting and extruding the filled polyester resin into a film; and biaxially stretching the sheet,
   whereby producing the biaxially stretched polyester film;
   wherein, when said biaxially stretched film is 75 to 125 μm thick, it has a haze of not more than 2.0% when measured with light at 589 nm; it has a static friction coefficient/kinetic friction coefficient of not more than 0.70/0.60; has improved windability; and, when rolled, it does not have a milky appearance.

2. A method for the production of polyester film set forth as claim 1, wherein the macro particles of silica are added in an amount of approximately 0.001 to approximately 0.1% by weight based on the total weight of the film.

3. A method for the production of polyester film set forth as claim 1, wherein the fine particles of aluminum oxide are added in an amount of approximately 0.01 to approximately 0.5% by weight.

4. A method for the production of polyester film set forth as claim 3, wherein the fine particles of aluminum oxide have a Mohs hardness of not less than 6 and a crystalline phase of δ or γ.

* * * * *